United States Patent

Chabardes et al.

[11] 3,865,878
[45] Feb. 11, 1975

[54] UNSATURATED SULPHONES

[75] Inventors: Pierre Chabardes, Lyon; Marc Julia, Paris; Albert Menet, La Mulatiere, all of France

[73] Assignee: Rhone-Poulenc S.A, Paris, France

[22] Filed: Feb. 1, 1973

[21] Appl. No.: 328,597

[30] Foreign Application Priority Data
Feb. 4, 1972  France .................. 72.03806
Apr. 10, 1972  France .................. 72.12480

[52] U.S. Cl. ......... 260/590, 260/293.51, 260/326.8, 260/326.84, 260/455 C, 260/464, 260/465 R, 260/468 R, 260/488 CD, 260/488 H, 260/570.5 S, 260/594, 260/599, 260/607 A
[51] Int. Cl. ................... C07c 49/76, C07c 49/82
[58] Field of Search ..................... 260/590

[56] References Cited
UNITED STATES PATENTS

| | | | |
|---|---|---|---|
| 3,185,743 | 5/1965 | LaCombe et al. ................. | 260/590 |
| 3,442,901 | 5/1969 | Koenig et al. ..................... | 260/590 |
| 3,567,780 | 3/1971 | Martel et al. ..................... | 260/590 |

Primary Examiner—Daniel D. Horwitz
Attorney, Agent, or Firm—Stevens, Davis, Miller & Mosher

[57] ABSTRACT

Sulphones useful for preparing polyenes have the formula

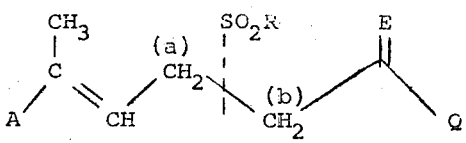

in which the suphone group replaces a hydrogen atom on carbon atom (a) or (b), R represents alkyl, alkylaryl or aryl, optionally substituted, E represent free or protected oxygen or methylene, when E represents free or protected oxygen, Q represents hydrogen, optionally substituted alkyl or aromatic, when E represents methylene Q represents halogen, inorganic anion or $NR_1R_2$ where $R_1$ and $R_2$ represent alkyl, aryl or together with nitrogen form a heterocylic structure, or $OR_3$ or $SR_3$ where $R_3$ represents alkyl, aryl or acyl, and A represents an optionally substituted hydrocarbon of $5n + 1$ carbon atoms ($n$ is 1-8), methyl optionally substituted by halogen, sulphide or sulphone, $CH_2OH$ (or ether or ester thereof), CHO (optionally protected), COOH (or an acid chloride, ester or nitrile thereof).

14 Claims, No Drawings

UNSATURATED SULPHONES

This invention relates to unsaturated sulphones.

The present invention provides sulphones of the general formula:

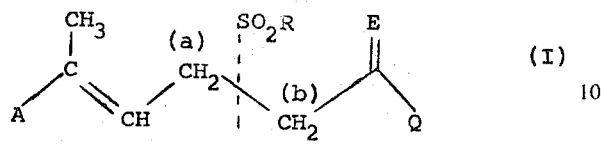

in which the sulphone group $SO_2R$ replaces a hydrogen atom or carbon atom (a) or (b), R represents an alkyl, alkyl-aryl or aryl radical which is substituted or unsubstituted. E represents an oxygen atom, a protected oxygen atom (e.g. as a ketal such as one with an alcohol of 1 to 6 carbon atoms) or methylene.

When E is oxygen or protected oxygen, Q is a hydrogen atom or a saturated or unsaturated, linear or branched, alkyl radical which is unsubstituted or substituted and can contain at least one functional group or a hetero-atom. Q can also be aromatic, e.g. an aromatic hydrocarbon radical such as phenyl. When E is methylene, Q represents a halogen, an inorganic anion with an associated cation(examples of the anion being $O^-$ and $S^-$ and of the cation alkali metals), a $NR_1R_2$ radical in which each of $R_1$ and $R_2$ which may be the same or different, represents an alkyl radical (e.g. of 1 to 6 carbon atoms such as methyl) or aryl radical (e.g. an aromatic hydrocarbon radical such as phenyl, optionally with halogen or alkyl substituents of preferably 1 to 6 carbon atoms) or together with the nitrogen, form a heterocyclic structure such as a piperidine or pyrrolidine, or a $-OR_3$ or $-SR_3$ group in which $R_3$ represents alkyl (e.g. of 1 to 6 carbon atoms such as methyl), aryl (e.g. as defined above for $R_1$ and $R_2$) or acyl (e.g. of an alkanoic acid of 1 to 6 carbon atoms).

A represents (a) a hydrocarbon radical of $5n + 1$ carbon atoms, which is substituted or unsubstituted, and in which $n$ is 1 to 8. This radical can be saturated or unsaturated with conjugated and/or unconjugated ethylenic unsaturation; it can possess functional groups and/or can be substituted by alkyl groups; when $n$ is 2 to 8, this radical can contain a ring to which alkyl and/or functional groups such as O= or —OH may be attached, the functional groups being free or protected.

A can also represent:

b. a methyl radical which is unsubstituted or substituted by halogen (e.g. chlorine or bromine) or a sulphide or sulphone group, c. a primary alcohol group $-CH_2OH$, an ether thereof (e.g. an alkyl ether with preferably 2 to 7 carbon atoms) or an ester which it forms with an inorganic or organic acid (such as an alkanoic acid of 1 to 6 carbon atoms), d. a free or protected aldehyde group (e.g. as an acetal with an alcohol with 1 to 6 carbon atoms) or an acid group —COOH, its acid chloride, an ester thereof (e.g. with an alkanol of 1 to 6 carbon atoms) or a nitrile group.

R preferably represents an aryl radical e.g. an aromatic hydrocarbon radical (such as a phenyl radical), which may optionally be substituted e.g. by chlorine or alkyl of preferably 1 to 4 carbon atoms.

Q preferably represents an alkyl or alkoxy radical, e.g. of 1 to 6 carbon atoms, (such as methyl or ethoxy) or a halogen atom e.g. a chlorine atom or bromine atom.

The hydrocarbon radical represented by A is preferably a group having a carbon skeleton of formula

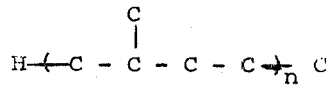

wherein $n$ is 1 – 8, each $C_5$ unit containing 0 - 2 ethylenic double bonds, the remaining valencies being satisfied by hydrogen atoms, or two adjacent $C_5$ units are joined to form a structure containing a ring of 6 ring carbon atoms, which can be substituted by a hydroxy or oxo group, or by a methyl group additional to the methyl substituents forming part of the carbon skeleton of $C_5$ units. The ring is usually a 2,6,6-trimethyl cyclohex-1-enyl ring.

Preferred examples of radicals represented by A are 2-(2,6,6-trimethylcyclohex-1-enyl)-ethenyl radical, 6-(2,6,6-trimethylcyclohex-1-enyl)-4-methylhexa-1,3,5-tri-enyl radical, a 4,8-dimethylnona-3,7-dienyl radical, a 4-methylpent-3-enyl radical, a methyl radical or a sulphone group $-CH_2SO_2R'$ wherein $R'$ represents an alkyl, alkylaryl or aryl radical, which is substituted or unsubstituted, preferably as defined for R above.

In these new derivatives, which are of considerable value as agents for synthesising various terpene compounds, the sulphone group is in the $\alpha$- or $\beta$-position relative to the carbonyl group which can be free, protected or enolised.

The present invention also provides a process for preparing a sulphone of formula I, which comprises reacting a compound of the formula $A-C(CH_3)=\lambda$ $CH-CH_2X$ with a compound of the formula $YCH_2-C(Q)=E$, one of X and Y representing a halogen atom and the other a group $SO_2R$, in the presence of a basic agent capable of converting the compound in which X or Y represents a sulphone group $SO_2R$, into its anion, A, Q, E and R being as defined above. This process has two embodiments. The first embodiment is a process for the preparation of a sulphone of formula I in which the sulphone group replaces a hydrogen atom on carbon atom (a), which comprises reacting a sulphone of the formula $A-C(CH_3)=CH-CH_2SO_2R$ (VIII) with a halide of the formula $X-CH_2-C(Q)=E$, in the presence of a basic agent capable of converting the sulphone (VIII) into its anion, A, Q, R and E being as defined above and X representing a halogen atom, and particularly a chlorine or bromine atom. An equation for the reaction can be given as follows:

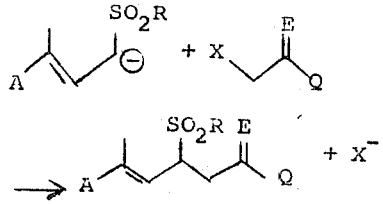

In the second embodiment a halide of the formula $A-C(CH_3)=CH-CH_2X$ and a sulphone $R-SO_2C-H_2-C(Q)=E$ are reacted together in the presence of the basic agent to produce a sulphone of formula I in which the —SO₂R group replaces a hydrogen atom on carbon atom (b).

The halides employed in these reactions are either haloacetaldehydes or halomethyl ketones in which the carbonyl group is free, protected or enolised, or halides of various terpene compounds of the formula A—C(CH₃)=CH—CH₂X in which X represents the halogen and A is as defined above. Examples of these halides are chloro- or bromo-acetaldehydes, chloroacetone, bromoacetone, 3-halogeno-2-alkoxy-propenes, 3-halogeno-2-acyloxy-propenes, 2,3-dichloropropene, 2,3-dibromopropene, prenyl halides, geranyl halides, farnesyl halides, retinyl halides and, more generally, polyterpene halides of various degrees of saturation, which optionally contain a trimethylcyclohexyl ring.

The starting sulphones can be compounds, in which a free, protected or enolised carbonyl group is located in the α-position to the sulphone group, or sulphones of the formula A—C(CH₃)=CH—CH₂SO₂R in which R and A are as defined above. Examples of these sulphones are alkylsulphonylacetones, arylsulphonylacetones, isoprenyl-alkyl- (or aryl-) sulphones, geranyl-alkyl- (or aryl-)-sulphones, and retinyl-alkyl- (or aryl-) sulphones. These sulphones may be made by conventional processes e.g. reaction of an alkyl halide with an alkali metal sulphinate.

Compounds of formula A—C(CH₃)=CH—CH₂SO₂R and wherein A represents a 2-(2,6,6-trimethylcyclohex-1-enyl)-ethylene group are described and claimed in U.S. Ser. No. 218838 filed January 18, 1972 by Marc Julia now U.S. Pat. No. 3,781,313. They may be prepared by reacting an alkali metal sulphinate of formula RSO₂M, wherein R and M are as defined above with either a compound of formula A—C(CH₃)=CH—CH₂X, wherein X represents chlorine, bromine or iodine, obtained by halogenation of vinyl-β-ionol with a phosphorus trihalide, or with vinyl-β-ionol itself.

Compounds of formula A—C(CH₃)=CH—CH₂SO₂R wherein A represents a group —CH₂X or CH₂SO₂R, where X represents a halogen, are described and claimed in U.S. Ser. No. 328,600 filed Feb. 1, 1973 by Albert Menet. They may be prepared by reacting an alkali metal sulphinate of formula RSO₂M with a 1,4-dihalogeno-2-methylbut-2-ene or, when A represents a group CH₂SO₂R, with a compound of formula X—C(CH₃)=CH—CH₂SO₂R where X represents a halogen.

Compounds of formula A—C(CH₃)=CH—CH₂SO₂R, wherein A represents a group CH₂OR₁, where R₁ represents an alkyl or aryl group which may be substituted, are described and claimed in U.S. Ser. No. 328,611 filed Feb. 1, 1973 by Albert Menet now U.S. Pat. No. 3,835,195. They may be prepared by reacting an alkali metal compound of formula R₁OM with a 4-alkyl-(or aryl)sulphonyl-2-methyl-but-2-enyl halide.

Compounds of formula A—C(CH₃)=CH—CH₂—SO₂R in which A represents a 6-(2,6,6-trimethylcyclohex-1-enyl)-4-methylhexa-1,3,5-trienyl radical are described and claimed in U.S. Ser. No. 254103 filed May 17, 1972 in the name of Pierre Chabardes and Marc Julia now U.S. Pat. No. 3,803,252. They may be prepared by reacting an alkali metal sulphinate with retinol or a retinol ester of an inorganic or organic acid, e.g. retinyl chloride, or with 3-retinol.

Retinyl halides, which are known compounds are preferably prepared by a process comprising reacting 1-(or 3)retinol with a halogenating reagent (e.g. phosphorus trichloride or tribromide) at a low temperature and in an inert solvent. This process is described and claimed in U.S. Ser. No. 254102 filed May 17, 1972 in the name of Pierre Chabardes.

The processes of the present invention are carried out in the presence of a basic agent which possesses sufficient activity to convert the sulphone employed into an anion. The basic agents which are suitable are inorganic or organic compounds, examples of which are alkali metal alcoholates, alkali metal hydrides or amides or organometallic compounds such as organozinc, organo-lithium and organo-magnesium compounds. They can be used alone or in conjunction with another basic agent intended to neutralise the hydrohalic acid formed. When the basic agent is used alone, the amount employed must be sufficient to achieve this neutralisation. The amount used also depends on how the reaction is carried out and on the reactivity of the products of the reaction with respect to this basic agent. For these various reasons, it can be advantageous to employ a smaller amount of basic agent in the reaction and to add another basic agent, with respect to which the products of the reaction are less sensitive, in an amount sufficient to neutralise the hydrohalic acid formed.

The reaction can be carried out at temperatures which can range from —100°C to +150°C, depending on the nature of the products employed and produced.

In order that the reaction can take place satisfactorily, it is advantageous to carry it out in an organic solvent which can be a hydrocarbon such as hexane, benzene or toluene, a protic solvent e.g. methanol, ethanol or ethylene glycol, or a linear or cyclic ether of a monoalcohol or a diol such as diethyl ether, dioxane or tetrahydrofuran. Other solvents such as dimethylformamide, dimethylacetamide, dimethylsulphoxide, N-methylpyrrolidone and hexamethylphosphotriamide are also suitable.

In certain cases, such as when A represents a methyl group with a sulphone substituent, e.g. —CH₂SO₂R', the halides of terpene compounds A—C(CH₃)=CH—CH₂X can be replaced by a compound which possesses a terminal diene chain, of the formula A'=C(CH₃)—CH=CH₂, A' representing a divalent radical such that A'H corresponds to the radical A as defined above. This diene compound reacts with a sulphone Q—C(=E)—CH₂SO₂R in accordance with the equation to form a sulphone of formula I in which the sulphone group replaces a hydrogen atom on carbon atom (b).

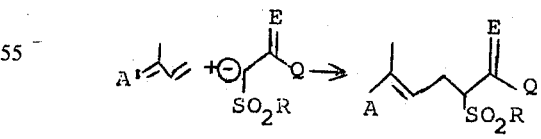

This reaction is carried out in the presence of an inorganic or organic alkaline agent such as an alkali metal hydroxide or alcoholate, an amine such as diethylamine, diisopropylamine, pyridine, triethylamine or tributylamine, or a quaternary ammonium hydroxide. The reaction can be carried out with or without a solvent but it is however preferable to choose a solvent so that the reaction takes place in a homogeneous phase. This solvent can be an alcohol such as methanol, ethanol and tertiary butyl alcohol or an ether such as diethyl ether, dioxane or tetrahydrofuran or any other inert solvent such as benzene, toluene, dimethylformamide, or acetonitrile. It can take place at ambient temperature; when the products of the reaction are not affected by heating, the reaction can be accelerated by working at a higher temperature. If the products of the reaction are sensitive to heat, the reaction can be carried out at temperatures below ambient temperature. A description of all the working conditions relating to the Michael Reaction, of which this variant is an application, will be found in "Organic Reactions, vol. 10, p. 264-266 — The Michael Reaction".

The compounds of the formula I make it possible to obtain, by desulphonation, carbonyl terpene compounds which are of great value as such and as intermediates. Desulphonation can be carried out by a simple reduction (e.g. with lithium/ethylamine) and carbonyl compounds are then obtained which contain a grouping $-C(CH_3)=CH-CH_2-$

and after deprotection or enolization the chain

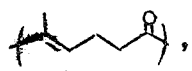

such as in methylheptenone, geranylacetone and farnesyl acetone, these being compounds which are used to synthesise other terpenes and vitamins E and K. It can also be carried out by means of an inorganic or organic basic agent such as an alkali metal hydroxide, and alkali metal carbonate or an alkali metal alcoholate, and carbonyl compounds which contain a grouping

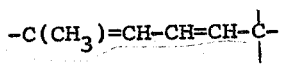

after deprotection or enolization the chain

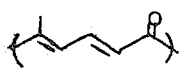

are then formed, examples of which are ionones and pseudoionones and irones and pseudoirones; $C_{18}$, $C_{23}$ and higher ketones, these being ketones from which vitamin A and its derivatives, apocarotenals and their derivatives and various linear, monocyclic or dicyclic carotenoid compounds and their functional derivatives can be prepared. Thus this method employing sulphones makes it possible easily to obtain $\alpha,\beta$-ethylenic ketones, the synthesis of which in the terpene series was hitherto difficult to achieve in good yield. Moreover, this method is also of great value economically, because whatever the desulphonation treatment chosen, it results in the liberation of an alkali metal sulphinate or a sulphinic acid which can be re-used to prepare the starting sulphones in accordance with a conventional process for preparing sulphones, such a conventional process consists of reacting an alkyl halide with an alkali metal sulphinate, for example an alkali metal phenylsulphinate or methylsulphinate. Thus since these sulphones are intermediates in the synthesis of terpene compounds, practically no alkali metal sulphinate is consumed.

The following Examples illustrate the preparation of sulphones according to the invention:

EXAMPLE 1

30 cm³ of tetrahydrofuran and 5-(2,6,6-trimethylcyclohex-1-enyl)-3-methyl-1-chloro-penta-2,4-diene, which was prepared by reacting phosphorus trichloride with 6.66 g. ($3 \times 10^{-2}$ mol) of vinyl-$\beta$-ionol in accordance with the process described in J. Amer. Chem. Soc., 1935, 57, 340-4 are introduced into a 100 cm³ flask equipped with a stirrer, a condenser, a dropping funnel and an argon inlet. 7.84 g ($7 \times 10^{-2}$ mol) of potassium t-butylate are added in 3 stages at $-70°C$, under argon, followed by 20 cm³ of tetrahydrofuran, and the mixture is stirred for 6 minutes. 7.92 g ($4 \times 10^{-2}$ mol) of phenyl-sulphonyl-acetone and 6 cm³ of tetrahydrofuran are introduced over the course of 5 minutes and the mixture is left for 5 minutes at $-70°C$. The temperature is allowed to rise to $-10°C$ over the course of 1 hour, and the reaction mixture is kept for several hours. The reaction mixture is then poured into a mixture of 250 cm³ of water and 100 cm³ of diethyl ether. The aqueous phase is decanted and extracted with 3 times 100 cm³ of diethyl ether. The combined ether layers are washed with 3 times 50 cm³ of water, dried over magnesium sulphate and then concentrated. 13.4 g of a crude product are obtained, in which 4.4 g of a product corresponding to the formula:

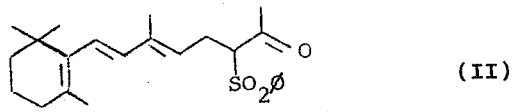 (II)

are identified and measured by nuclear magnetic resonance and thin layer chromatography.

Yield: 45% relative to the chlorinated derivative employed.

EXAMPLE 2

1 g. of potassium metal is reacted with 30 cm³ of t-butanol, under an atmosphere of nitrogen, in a 100 cm³ flask. The mixture is heated to about 70°C in order to bring about the complete disappearance of the metal, and is then cooled to 25°C. 6.73 g ($3.4 \times 10^{-2}$ mol) of phenylsulphonylacetone are then added in small portions, followed by 5 g of geranyl bromide, run in over the course of 20 minutes. The reaction mixture is stirred for 15 minutes and then heated gradually to reach 65°C in the mixture, which is kept at this temperature for 1 hour 30 minutes. The flask is cooled to 20°C, and the precipitate which has formed is filtered off and washed with 10 cm³ of diethyl ether. The filtrate is then concentrated under the vacuum of a water pump and the residue is taken up in 250 cm³ of water + 250 cm³ of diethyl ether. The aqueous layer is decanted and extracted with 200 cm³ of diethyl ether. The combined ether layers are dried over sodium sulphate, filtered and then evaporated. 6 g of a light yellow viscous liquid are thus isolated, in which 90% of a compound identified as being a 3-phenyl-sulphonyl-pseudoionone of the formula:

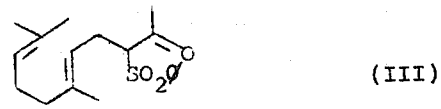 (III)

are measured by nuclear magnetic resonance. Yield: 70%.

EXAMPLE 3

5 cm³ of tetrahydrofuran and 1.8 g. of potassium t-butylate are introduced, with stirring, into a flask purged with nitrogen; the flask is cooled to −30°C and 2.86 g. of farnesyl bromide are run in. The temperature of the flask is lowered to −60°C and a solution of 1.98 g of phenylsulphonylacetone in 5 cm³ of tetrahydrofuran + 1 cm³ of ethylene glycol is run in over the course of 5 minutes. The reaction mixture is then stirred for 1 hour 30 minutes, the temperature being kept at −50° to −60°C. The temperature is allowed to rise to +5°C in ice, where the flask remains for 4 hours 30 minutes. Potassium bromide precipitates; the reaction mixture is taken up in 50 cm³ of distilled water and 50 cm³ of diethyl ether and the aqueous layer is decanted and extracted with twice 25 cm³ of diethyl ether. The combined ether layers are dried over sodium sulphate, filtered and concentrated by evaporation in vacuo. 4.7 g of an orange viscous liquid are thus obtained, in which 3.2 g of a product corresponding to the formula:

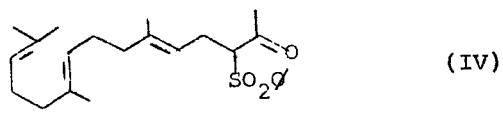

(IV)

are measured by nuclear magnetic resonance. Yield: 80%.

EXAMPLE 4

4 g of 3-methyl-but-2-enyl-phenylsulphone in 20 cm³ of tetrahydrofuran which has been cooled to −70°C are kept in contact, under nitrogen, with 7.5 cm³ of a solution of butyl-lithium in hexane (solution containing 17 g per 100 cm³). 2.22 g of 2,3-dichloro-1-propene in 20 cm³ of tetrahydrofuran are added over the course of 15 minutes. The mixture is stirred for several hours at 25°C and then run into a mixture of 200 cm³ of an aqueous solution of sodium chloride and sodium bicarbonate. The mixture is extracted with diethyl ether and the ether layers are washed with salt water, dried and concentrated by evaporation. After recrystallisation from an isopropanol/water mixture, the residue gives white crystals, of melting point 82° – 83°C, which correspond to the formula:

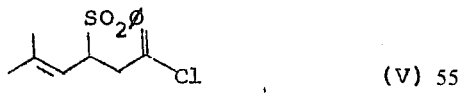

(V)

according to the elementary analysis, infra-red spectrography and nuclear magnetic resonance. Yield: 94%.

EXAMPLE 5

A solution of 1.71 g of 5-(2,6,6-trimethyl-cyclohex-1-enyl)-3-methyl-penta-2,4-dienyl-phenyl-sulphone in 3 cm³ of tetrahydrofuran is run, over the course of 15 minutes, into a flask which contains 1.88 g of potassium t-butylate and 3 cm³ of tetrahydrofuran and which has been cooled to −30°C. A solution of 1.2 g of 1-chloro-2-ethoxy-propene in 2 cm³ of tetrahydrofuran is then run in over the course of 2 minutes. The reaction mixture is kept for 4 hours at −20°C to −30°C, and is then poured into a mixture of 25 cm³ of iced water and 50 cm³ of diethylether. The aqueous layer is decanted and washed with twice 20 cm³ of diethyl ether. The combined ether layers are treated as above and a green-yellow oil is obtained in which 1.01 g of unconverted starting sulphone and 0.63 g of a product of the formula:

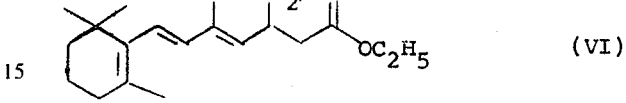

(VI)

are measured.

Degree of conversion of the sulphone employed: 41%. Yield of the product of the formula VI: 72%.

The starting sulphone is obtained by reacting an alkali metal phenylsulphinate with a halide of the same carbon structure. This sulphone and its preparation are described and claimed in aforesaid U.S. Ser. No. 218838.

EXAMPLE 6

1.88 g of potassium t-butylate and 3 cm³ of anhydrous tetrahydrofuran are introduced into a 50 cm³ flask, under a nitrogen atmosphere. The mixture is cooled to −20°C and a solution of 1.05 g of phenyl-3-methyl-but-2-enyl-sulphone in 4 cm³ of tetrahydrofuran is run in over the course of 2 minutes. A solution of 1.2 g of 3-chloro-2-ethoxy-propene in 2 cm³ of tetrahydrofuran is then run in over the course of 2 minutes. The mixture is kept at −20°C for 15 minutes and then at 22°C for 5 hours. The reaction mixture is treated as in the preceding examples and a green-yellow oil is obtained which contains 0.24 g of unconverted starting sulphone, 0.20 g of 6-methyl-hepta-3,5-dien-2-one and 0.60 g of 6-methyl-4-phenyl-sulphonyl-2-ethoxy-hepta-1,5-diene:

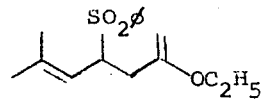

Degree of conversion of the starting sulphone: 77%. Yield: 90% to this sulphone (this yield takes into account the methylheptadienone formed by desulphonation of the sulphone obtained).

EXAMPLE 7

A solution of 1.98 g of phenylsulphonylacetone in 10 cm³ of acetonitrile and 1.5 cm³ of ethylene glycol is introduced into a 100 cm³ three-necked flask equipped with a mechanical stirrer, a dropping funnel, a condenser and a nitrogen inlet. 0.5 g of trimethyl-benzyl-ammonium hydroxide (TRITON B) in 2 cm³ of acetonitrile is then added. A solution of 2.1 g of 1-phenylsulphonyl-2-methyl-butadiene in 3 cm³ of acetonitrile is run in over the course of 25 minutes and the mixture is then heated at 70°C for several hours. After cooling, the reaction mixture is poured into 200 cm³ of water and 100 cm³ of diethyl ether. The aqueous phase is then decanted and extracted with 3 times 50 cm³ of diethyl ether. The combined ether layers are dried over magnesium sulphate and then concentrated in vacuo. 3 g of an oil are thus obtained in which a product corresponding to the formula:

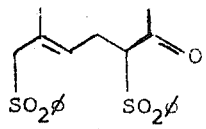

is identified and measured by thin layer chromatography, nuclear magnetic resonance and infra-red spectrography. Degree of conversion 100% Yield 30%.

1-Phenylsulphonyl-2-methyl-butadiene can be prepared in accordance with the process described in Journal of Organic Chemistry, 35, 4219 (1970).

We claim:

1. A sulphone of the formula:

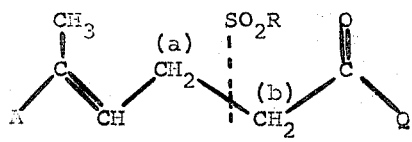

in which the sulphonyl group replaces a hydrogen atom on carbon atom (a) or (b), R is an alkylaryl or aryl hydrocarbon radical, Q is an alkyl, alkenyl, or aromatic hydrocarbon radical, and A represents (a) a hydrocarbon radical having a carbon skeleton of formula:

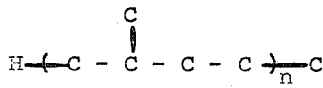

wherein $n$ is 1 to 8, each $C_5$ unit containing 0–2 ethylenic double bonds, the remaining valencies being satisfied by hydrogen atoms or two adjacent $C_5$ units are joined to form a structure containing a ring of 6 ring carbon atoms, (b) a methyl radical which is unsubstituted or substituted by halogen or a sulphide or sulphone group, or (c) a primary alcohol group —CH₂OH or alkyl ether thereof with 2 to 7 carbon atoms.

2. A process for the preparation of a sulphone of formula:

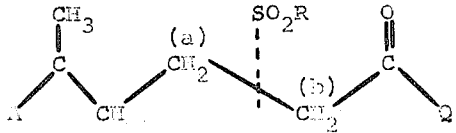

in which the sulphonyl group replaces a hydrogen atom on carbon atom (a) or (b) and A, Q and R are as defined in claim 26, which process comprises reacting a compound of the formula:

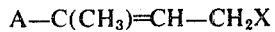

with a compound of the formula:

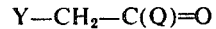

wherein one of X and Y represents a halogen atom and the other represents a group SO₂R, in the presence of a basic agent capable of converting the compound in which X or Y represents the sulphone group SO₂R into its anion.

3. A sulphone according to claim 1 wherein R represents a phenyl radical.

4. A sulphone according to claim 1, wherein Q represents an alkyl radical of 1 to 6 carbon atoms.

5. A sulphone according to claim 4 wherein Q represents a methyl radical.

6. A sulphone according to claim 1, wherein A represents a 2-(2,6,6-trimethylcyclohex-1-enyl)-ethenyl radical, 6-(2,6,6-trimethylcyclohex-1-enyl)-4-methylhexa-1,3,5-trienyl radical, a 4,8-dimethylnona-3,7-dienyl radical, a 4-methylpent-3-enyl radical, a methyl radical or a sulphone group —CH₂SO₂R' wherein R' represents an hydrocarbon, alkylaryl or aryl radical.

7. A sulphone according to claim 6 wherein A represents a phenylsulphonyl-methyl group.

8. A sulphone according to claim 6 wherein A represents a 2-(2,6,6-trimethyl-cyclohex-1-enyl)-ethenyl radical, and Q represents an alkyl radical of 1 to 6 carbon atoms.

9. 8-(2,6,6-Trimethyl-cyclohex-1-enyl)-6-methyl-3-phenylsulphonyl-octa-5,7-dien-2-one.

10. 6,10,14-Trimethyl-3-phenylsulphonyl-pentadeca-5,9,13-trien-2-one.

11. 6,10-Dimethyl-3-phenylsulphonyl-undeca-5,9-dien-2-one.

12. 1,5-Bis-phenylsulphonyl-2-methyl-6-keto-2-heptene.

13. A sulphone according to claim 1 in which R is alkylaryl or aryl, Q is methyl, and A is 2-(2,6,6-trimethylcyclohex-1-enyl)ethenyl, 4,8-dimethylnona-3,7-dienyl, 4-methylpent-3-enyl, or a sulphone group —CH₂SO₂R' where R' is alkylaryl, or aryl hydrocarbon radical.

14. A sulphone according to claim 13 in which R and R' are both phenyl

* * * * *

UNITED STATES PATENT OFFICE
CERTIFICATE OF CORRECTION

Patent No. 3,865,878     Dated February 11, 1975

Inventor(s) Pierre CHABARDES et al

It is certified that error appears in the above-identified patent and that said Letters Patent are hereby corrected as shown below:

Claim 2, column 10, line 5, "claim 26" should read --claim 1--.

Signed and sealed this 15th day of July 1975.

(SEAL)
Attest:

RUTH C. MASON
Attesting Officer

C. MARSHALL DANN
Commissioner of Patents
and Trademarks